United States Patent [19]

Morra et al.

[11] Patent Number: 5,322,737
[45] Date of Patent: Jun. 21, 1994

[54] FORMED ARTICLES MADE OF POLYMERIC MATERIAL AND HAVING IMPROVED SURFACE CHARACTERISTICS AND PROCESS FOR PRODUCING THEM

[75] Inventors: Marco Morra, Asti; Ernesto Occhiello; Fabio Garbassi, both of Novara, all of Italy

[73] Assignee: Enichem S.P.A., Milan, Italy

[21] Appl. No.: 132,217

[22] Filed: Oct. 6, 1993

Related U.S. Application Data

[63] Continuation of Ser. No. 780,243, Oct. 22, 1991, abandoned.

[30] Foreign Application Priority Data

Oct. 24, 1990 [IT] Italy .............................. 21864 A/90

[51] Int. Cl.⁵ .............................................. B32B 27/36
[52] U.S. Cl. .................................... 428/412; 427/488; 427/491; 428/476.3; 428/483; 428/516; 428/520
[58] Field of Search ................. 427/488, 491; 428/412, 428/476.3, 483, 516, 520

[56] References Cited

U.S. PATENT DOCUMENTS 4,885,077 12/1989 Karakelle et al. .............. 427/243 X
5,028,332 7/1991 Ohnishi ........................... 427/245 X Primary Examiner—Michael Lusignan
Attorney, Agent, or Firm—Oblon, Spivak, McClelland, Maier & Neustadt

[57] ABSTRACT

Formed articles having improved surface properties, such as wettability, printability, adhesion, antistaticity and clouding resistance, consisting of a polymeric finished article or semi-finished article coated on at least a surface with a polyhydroxethylacrylate layer, preferably prepared by means of plasma polymerization.

10 Claims, No Drawings

FORMED ARTICLES MADE OF POLYMERIC MATERIAL AND HAVING IMPROVED SURFACE CHARACTERISTICS AND PROCESS FOR PRODUCING THEM

This application is a continuation of application Ser. No. 07/780,243, filed on Oct. 22, 1991, now abandoned.

BACKGROUND OF THE INVENTION

1. Field of the Invention

The invention relates to formed articles such as manufactured articles, semi-finished articles (films, sheets, plates, etc.) made of a polymeric material and characterized by improved surface properties in the whole, and to the process for preparing them.

2. Discussion of the Background

The obtained products are broadly utilized in the packing field as they permit to obtain polymeric materials which can be printed without applicating primers and are endowed with a good adhesion along with antistatic electric characteristics as well as with good wettability, printability and clouding resistance (absence of condensate) properties.

In particular, the products obtained according to the present invention can be utilized with particular advantages in the production of sheets for greenhouses for optical components, antistatic containers for electronic components, and the like.

It is known that several technological applicative properties relating to polymers depend on their surface characteristics, more specifically on their hydrophilicity, by which other characteristics such as printability, adhesion, anti-staticity, etc. are conditioned. These are heterogeneous characteristics which raise serious technological problems as regards their simultaneous obtainment in a single finished or semi-finished article. Generally, depending on the final applicative purpose and, therefore, depending on the prevailing characteristics which are to be imparted to the article, particular technological solutions are adopted. By consequence, the resulting products hardly exhibit on the whole all the characteristics, which theoretically the article should exhibit for the particular use it is intended for, but generally they are lacking of one or the other above-cited properties such as, in particular, wettability, printability, adhesion, antistaticity, clouding resistance.

Several methods for individually improving the above-said properties are known in the art. These methods can be divided into chemical or physical surface treatments and additioning treatments.

The former can mainly consist in the chemical attack of the surface by solutions which, depending on the polymer type, can be acid, basic and/or oxidizing. However, this type of treatment involves the use of etching liquids, which are potentially dangerous and/or toxic for the work environment; furthermore it is necessary to dispose of said liquids when the use thereof is no longer required.

To the surface treatments belong also the chemical graftings, as are described for example in U.S. Pat. No. 4,728,694. In this case the drawbacks are the slow procedure and the use of chemical compounds, which are potentially dangerous, toxic for the work environment and difficult to be disposed of.

Another chemical surface treatment, which is utilized in order to obtain a better paintability, consists in applying a primer. This is a substance which gives rise to an intermediate layer between polymer and paint (or adhesive), which enhances the interaction thereof. The main drawback is represented by the necessity of applicating a very thin layer having a prefixed thickness; furthermore, the use of toxic solvents is often required.

Among the physical surface treatments, the most frequently described methods are flashing, corona discharge and the treatment with low pressure plasma. In the first two cases the drawbacks are mainly connected with the difficulty to obtain a uniform treatment on articles having a complex shape; as regards the treatments with corona discharge and with low pressure plasma, a low efficiency and a rapid decay of the effect in the long run are observed.

The other type of procedure for obtaining the hydrophilization of the polymeric surfaces consists in adding the polymer with proper polar chemical compounds tending to migrate to the surface. The drawbacks reside in the difficulty to dose the additive. A wrong dose or a non-homogeneous distribution can result in a lack of efficiency of the additive or in a loss of efficiency in the long run. Furthermore, toxicity problems can arise in the work environment, which are connected with the generation of fumes during the extrusion and molding of the added polymer.

Moreover it must be pointed out that the above-described methods are typically partial, i.e. they are capable of solving only some of the problems depending on the low surface tension (wettability) of the polymers. Typically, the flashing, corona discharge and plasma treatments can be utilized to improve the wettability, printability and adhesion, but they are substantially ineffective as regards an improvement in the antistaticity and clouding resistance conversely, the adding can be utilized to improve the antistaticity and clouding resistance, but it is typically ineffective in improving the adhesion and printability.

In conclusion, the prior art—as far as the Applicant knows at present—seems not to be capable of providing a method for the production of articles endowed with a sufficiently wide range of satisfactory characteristics and therefore suited to be directly utilized in a broad field of uses.

SUMMARY OF THE INVENTION

Thus, it is an object of the present invention to provide formed articles made of a polymeric material (finished articles and semi-finished articles), the surfaces of which not only do not exhibit the above-mentioned drawbacks, but also show appreciable simultaneous improvements as regards the wettability, printability, adhesion, antistaticity and clouding resistance.

A further object is a process for preparing the above-said articles or formed bodies having improved surface characteristics.

These and still further objects, which can be better apparent to those skilled in the art from the following description, are achieved, according to the present invention, by formed articles made of a polymeric material, having improved surface characteristics, superficially coated at least on one face or surface with at least a polyhydroxyethylacrylate layer.

DETAILED DESCRIPTION OF THE PREFERRED EMBODIMENTS

The polyhydroxyethylacrylate layer can be applied on the formed article by means of any type of polymerization, for example solution, suspension, emulsion or bulk polymerization, or also gas phase polymerization with photochemical activation, or lastly, by polymerization with electron beams, of the hydroxyethylacrylate; preferably by means of plasma-induced polymerization.

The present invention permits to obtain formed articles, in particular films, sheets and plates of polymeric materials, optionally also transparent, having improved characteristics of wettability, printability, adhesion, antistaticity and clouding resistance. Such a result is achieved by means of a process for superficially coating the already preformed article, which permits to increase the hydrophilicity of polymeric material surfaces. Polymeric materials which are suitable for being utilized are: polyolefins, polystyrenes, polymethacrylates, polycarbonates, polyesters and polyamides, mixtures thereof, etc.

In this way, formed articles (manufactured articles, semifinished articles) are obtained, which are contemporaneously endowed with the above-mentioned good surface characteristics, which are bound to the application of the polyhydroxyethylacrylate layer, the action thereof is selective.

In fact it was found that said result are not obtainable by the application of an equivalent layer of the analogous hydroxymethylmethacrylate derivative, as will be proved later on.

The application of the polyhydroxyethylacrylate, as mentioned before, is carried out by polymerization, preferably induced by plasma. Polyhydroxyethylacrylate layers having a thickness usually ranging from 1 to 100 nm, preferably from 5 to 60 nm, are applied.

A particularly advantageous embodiment, which however does not limit the invention, consists in introducing a formed article or body, for example a plate or a film, into a vacuum chamber, whereinto hydroxyethylacrylate vapours at a pressure ranging from 0.1 to 500 Pa, more preferably from 0.1 to 10 Pa, had been introduced.

A plasma discharge lasting 0.01 to 10 seconds, preferably 0.1 to 5 seconds, is then excited. The total residence time of the polymeric material article in the presence of the hydroxyethylacrylate vapours ranges from 0.1 to 20 seconds, more preferably from 1 to 10 seconds.

The plasma-induced polymerization is a substantially conventional technique, broadly described in literature along with the necessary apparatuses, for example in H. Yasuda "Plasma Polymerization" (Academic Press, Orlando, 1985) or in "Thin Film Processes", by J. L. Vossen and W. Kern (Academic Press, New York, 1978, pages 361-400).

As mentioned hereinbefore, the process according to the invention can be very advantageously applied to polyolefins, polyesters, polyamides, polycarbonates, styrene polymers and copolymers. The discharge can be excited by direct or alternating current or by means of radio-frequencies or microwaves.

The invention offers several advantages, which can be summarized as follows:

(a) obtainment of polymeric materials, particularly for packing, which permit the printing without primers and with a good adhesion;

(b) elimination of the drawbacks connected with the accumulation of static electricity and with the condensate of water droplets on the material surface;

(c) a simpler and more unitary handling of this type of packings, without the necessity to differentiate the treatments of the formed article as a function of the final applicative characteristics to be obtained.

Finally, it is to be pointed out that the shorter residence times—which are possible thanks to the use of hydroxyethylacrylate in the plasma polymerization—of the order of 1-10 seconds or below, permit much higher production capacities, which result in evident economical advantages.

A few illustrative examples, which do not limit the scope of the invention, are given hereinafter.

Example 7 is given as a comparison in order to prove the criticity of hydroxyethylacrylate with respect to hydroxyethylmethacrylate.

EXAMPLE 1

There was utilized a conventional reactor for the plasma-induced polymerization, made of aluminium, having a cylindrical shape, an inside diameter of about 40 cm and a height of about 30 cm, and having an electrode in the inside. The vacuum in the reactor was generated by a pumping device capable of reaching pressures of the order of 0.01 Pa. Hydroxyethylacrylate was introduced into the reactor by means of a pipe which brought to a vessel, the temperature of which was adjusted in order to optimize the evaporation rate.

While the remaining part of the chamber was maintained earthed, to the electrode placed above the sample a radio-frequency was applicated, to which the plasma energizing was due. A generator MTN 500 (produced by Advanced Energy, Fort Collins - Colo. - U.S.A.) capable of delivering 0 to 500 W at 13.56 MHz was utilized.

Wettability test and chemical composition of the layer

The materials indicated in Table 1 were introduced into the reactor and a polyhydroxyethylacrylate layer was deposited thereinto. Also the operative conditions are indicated in Table 1.

The thicknesses of the deposited layers as well as the contact angles obtained on the treated films are reported in Table 2.

The deposition rate was measured by means of a quartz microbalance (Intellemetrics, Clydebank, U.K.), using a polymer density equal to 1.

The advancement contact angles (A.A.) and the recession contact angles (R.A.) of water were measured by means of a Ramè-Hart contact angles meter (Mountain Lakes, N.J., U.S.A.) and are indicated in degrees. The sessile drop method was followed according to the procedures described in Dekker, N.Y. 1982.

Table 2 shows the values of the contact angles measured on the substrate as such (before) and coated (after).

TABLE 1

| Utilized materials: | |
|---|---|
| LDPE | (30 μm thick films of low density polyethylene produced by ANIC Italia under the trademark FERTENE EF 52100); |
| HDPE | (2.5 mm thick plate made of high density polyethylene produced by HIMONT Italia under the trademark MOPLEN RO); |
| PP | (2.5 mm thick plate made of polypropylene produced by HIMONT Italia under the trademark MOPLEN CP 179); |
| PS | 2 mm thick plate made of polystyrene produced by MONTEDIPE Italia under the trademark EDISTIR 1670); |
| PET | (12 μm thick film made of polyethylene terephthalate produced by ICI U.K. |

TABLE 1-continued

| | |
|---|---|
| | under the trademark MELINEX 800); or (2.5 mm thick plate made of polyethylene terephthalate produced by MONTEFIBRE Italia under the trademark VIVIPACK); |
| PC | (2 mm thick plate made of polycarbonate produced by BAYER AG., Germany, under the trademark MAKROLON 2800); |
| GRANLAR | (3 mm thick plate made of a thermotropic crystalline liquid polymer based on polyester, produced by GRANMONT, Ohio, U.S.A.). |

Operative conditions:

| | |
|---|---|
| Radio-frequency | 13.56 MHz |
| Power | 100 W |
| Pressure | 0.5 Pa |
| Treatment time | 2 seconds |
| Residence time | 4 seconds |

TABLE 2

| | | A.A. | | R.A. | |
|---|---|---|---|---|---|
| MATERIAL | THICKNESS (nm) | BEFORE | AFTER | BEFORE | AFTER |
| LDPE | 40 | 95 | 50 | 70 | 11 |
| HDPE | 40 | 94 | 48 | 73 | 12 |
| PP | 40 | 97 | 45 | 78 | 11 |
| PS | 40 | 90 | 46 | 80 | 11 |
| PET | 40 | 78 | 54 | 56 | 12 |
| PC | 40 | 80 | 48 | 70 | 12 |
| GRANLAR | 40 | 58 | 49 | 30 | 11 |

The XPS spectroscopy (X-ray Photoelectron Spectroscopy) was then used in order to evaluate the chemical correspondence of the deposited layer with the one of polyhydroxyethylacrylate. A description of the XPS method is given in "Practical Surface Analysis", by M. Seah and D. Briggs (published by Wiley, New York, 1983, pages 359–396). From the data of Table 3 it results that there is an excellent conformity of the theoretical composition with the measured composition. For a further check, the deposited layer was derivatized by reaction with trifluoroacetic anhydride, with quantitatively reacts with the hydroxyl end groups, as is described in the article by S. Lazare et al., J. Phys. Chem., 90, 2124 (1986). From the data reported in Table 3 it is once again apparent that there is a correspondence, in the range of the experimental error, with the theoretical result.

TABLE 3

| SAMPLE | COMPOSITION C | SURFACE O | (ATOMIC %) F |
|---|---|---|---|
| THEORETICAL COMPOS. | 62.5 | 37.5 | |
| MEASURED COMPOS. | 64.3 | 35.7 | |
| THEORETICAL COMPOS. AFTER DERIVATIZ. | 50.0 | 28.6 | 21.4 |
| MEASURED COMPOS. AFTER DERIVATIZ. | 53.1 | 24.5 | 22.4 |

Constant deposition rate = 11 nm/second.

EXAMPLE 2

Into the reactor of example 1, HDPE plates were introduced and the effect of the plasma parameters, in particular power and pressure, was evaluated, while maintaining for the remaining the operative values indicated in Table 1. The values of deposition rate and water contact angles (in degrees) are reported in Table 4. These values were obtained according to the methods described in the preceding example. A very limited effect both of the radio-frequency power and of the hydroxyethylacrylate pressure was observed.

TABLE 4

| POWER (W) | PRESSURE (Pa) | DEPOSITION RATE (nm/s) | A.A. | R.A. |
|---|---|---|---|---|
| 50 | 0.5 | 10 | 49 | 12 |
| 100 | 0.5 | 11 | 50 | 12 |
| 100 | 1.0 | 10 | 48 | 12 |
| 150 | 0.5 | 12 | 46 | 12 |

On the treated samples, the wettability trend as a function of the ageing time was checked; the results are reported in Table 5. As one can notice, there is no increase of the water contact angles even after 3 months from the treatment, what confirms the advantage of the proposed method also as regards ageing.

TABLE 5

| AGEING TIME (days) | A.A. | R.A. |
|---|---|---|
| 0 | 48 | 11 |
| 30 | 50 | 12 |
| 60 | 51 | 11 |
| 90 | 49 | 11 |

EXAMPLE 3

Into the reactor of example 1, LDPE and PET films were introduced and the effect of the polyhydroxyethylacrylate on the printability was evaluated. The inkability of the treated films was then evaluated before and after the treatment. Inking was effected by using an ink based on nitrocellulose produced by ITALFILM Italia and known under the trademark TERKEM, by means of brushing and drying in air. The ink adhesion effectiveness was evaluated by means of the scotch tape test according to standard ASTM D 3359.

Table 6 shows the results of the various tests. The evaluation scale ranges from 0 (no adhesion) to 5 (excellent adhesion). In all the dressed samples, remarkable improvements in adhesion and no ageing effects were observed.

TABLE 6

| MATERIAL | THICKNESS (nm) | AGEING (months) | PRINTABILITY |
|---|---|---|---|
| LDPE | 0 | 0 | 0 |
| LDPE | 50 | 0 | 4 |
| LDPE | 50 | 1 | 4 |
| PET | 0 | 0 | 3 |
| PET | 50 | 0 | 5 |
| PET | 50 | 1 | 5 |

EXAMPLE 4

Into the reactor of example 1, plates made of HDPE, PP and PET were introduced and the effect of the polyhydroxyethylacrylate deposition on the adhesion properties was evaluated. The adhesiveness was determined by means of a pull strength test, carried out by causing an aluminium punch to adhere to the polymeric surface by means of an epoxy adhesive. The utilized experimental measuring group is called Sebastian II and is produced by Quad Group, Spokane, Wash., U.S.A. which has supplied also the aluminium punches coated with an epoxy resin capable of resisting to pulling stresses up to 700 kg/cm$^2$. The results relating to this test are shown in Table 7.

First of all, a substantial improvement in the adhesion properties thanks to the treatment is apparent from the data. These properties, furthermore, are little affected by the thickness of the applied layer. Very important is the fact that the ageing does not cause any significant reduction in the adhesion strength.

TABLE 7

| MATERIAL | THICKNESS (nm) | AGEING (months) | PULL STRENGTH (kg/cm² |
|---|---|---|---|
| HDPE | 0 | 0 | 0 |
| HDPE | 25 | 0 | 42 |
| HDPE | 40 | 0 | 36 |
| HDPE | 40 | 3 | 41 |
| HDPE | 60 | 0 | 44 |
| HDPE | 60 | 3 | 40 |
| PP | 0 | 0 | 0 |
| PP | 25 | 0 | 50 |
| PP | 40 | 0 | 49 |
| PP | 40 | 3 | 40 |
| PP | 60 | 0 | 40 |
| PP | 60 | 3 | 46 |
| PET | 0 | 0 | 54 |
| PET | 50 | 0 | 142 |

EXAMPLE 5

Into the reactor of example 1, plates made of HDPE, PP, PET, PC and GRANLAR were introduced and the effect of the polyhydroxyethylacrylate deposition on the antistaticity was evaluated. The antistaticity evaluations were carried out as follows: Plates of polymer as such and of treated polymer were triboelectrified by means of a woolen cloth in a reproduceable manner and were positioned at a fixed distance (1 cm) from an electrostatic probe mod. 2503 interfaced to an electrometer mod. 610 C, both manufactured by Keithley, Cleveland, Ohio, U.S.A. The potential difference measured by the electrometer was reported: it corresponded to the charging caused by the triboelectrification. The ambient humidity was maintained at a constant value (35%).

The results are shown in Table 8. In all the cases it can be observed that while the untreated sample gets strongly charged by triboelectrification, the treated samples do not show any tendency to charging, not even after a long ageing.

TABLE 8

| MATERIAL | THICKNESS (nm) | AGEING (months) | CHARGING (1000.V) |
|---|---|---|---|
| HDPE | 0 | 0 | −12 |
| HDPE | 40 | 0 | 0 |
| HDPE | 40 | 3 | 0 |
| PP | 0 | 0 | −10 |
| PP | 40 | 0 | 0 |
| PP | 40 | 3 | 0 |
| PET | 0 | 0 | −10 |
| PET | 40 | 0 | 0 |
| PET | 40 | 3 | 0 |
| PC | 0 | 0 | −8 |
| PC | 40 | 0 | 0 |
| GRANLAR | 0 | 0 | −14 |
| GRANLAR | 40 | 0 | 0 |
| GRANLAR | 40 | 3 | 0 |

EXAMPLE 6

Into the reactor of example 1, LDPE films and PC plates were introduced and the effect of the polyhydroxyethylacrylate deposition on the clouding resistance was evaluated. The clouding resistance was evaluated as follows. The polymeric material (a plate or a film supported by means of a little frame) was placed at a height of 20 cm above a crystallizer, in which water was made to boil. The angle between the normal to the resting plane and the polymer was of about 60°.

The polymeric material was lit by means of a lamp. On the other side, an optical fibre was placed, which conveyed the transmitted light radiation to a multichannel spectrum analyzer. The radiation from 254 and 840 nm was collected and the spectrum was transmitted to a computer, which effected the signal integration, i.e. the count of the transmitted photons.

The measurements of the transmitted light amount were carried out when $H_2O$ was strongly boiling and the steam amount was such as to homogeneously reach the polymeric surface. For each measuring session, 5 spectra were recorded, with an exposure time of 1 second (s), at intervals of 30 s from one another. The measurement result was expressed as average of the number of the transmitted photons in the 5 recorded spectra and it was related to the amount of photons which were transmitted in the absence of water vapor.

The obtained results are reported in Table 9. As a consequence of the treatment it is possible to observe a much higher transmission of the transmitted light amount as compared with the presence of water vapor. Such phenomenon is also independent of ageing.

TABLE 9

| MATERIAL | THICKNESS (nm) | AGEING (months) | CLOUDING RES. (%) |
|---|---|---|---|
| HDPE | 0 | 0 | 78 |
| HDPE | 50 | 0 | 97 |
| HDPE | 50 | 1 | 96 |
| PC | 0 | 0 | 80 |
| PC | 50 | 0 | 99 |
| PC | 50 | 1 | 98 |

EXAMPLE 7

Into the above-described reactor there were introduced plates made of HDPE, PP, PET and PC and the effect of the polyhydroxyethylmethacrylate deposition on wettability, antistaticity and clouding resistance was evaluated.

Using the procedures illustrated in example 1 and the parameter reported in Table 1, it was observed that the polyhydroxyethylmethacrylate deposition occurred at a rate equal to 3 nm/s, i.e. somewhat lower than the rates indicated in Table 4. It was also observed that the chemical composition of the deposited layer, as determined by XPS, was consistent, also in this case, with the stoichiometrically calculable composition. The water advancement and recession contact angles, measured as it is described in example 1, were equal to 68° and 13°, respectively, after deposition of 40 nm of polyhydroxyethylmethacrylate. As is apparent from the comparison with the data of Table 2, the slight chemical difference of the layer as a consequence of the introduction of a methyl results in a considerable increase in the advancement angle.

It was then surprisingly observed that also other properties depending on the surface hydrophilicity were drastically modified by the substitution of polyhydroxyethylacrylate by polyhydroxyethylmethacrylate. Table 10 shows the antistaticity and clouding resistance values after deposition of a polyhydroxyethylmethacrylate layer, without subsequent ageing. The measuring procedures are the ones cited in examples 5 and 6.

As is apparent from the comparison with the data of Tables 8 and 9, the deposition of polyhydroxyethylmethacrylate layers did not lead to the surprising improvements in antistaticity and clouding resistance as were measured in the case of polyhydroxyethylacrylate. In fact, the values are only insignificantly better than the ones determined for the untreated polymers.

TABLE 10

| MATERIAL | THICKNESS (nm) | CHARGING (kV)) | CLOUDING RES. (%) |
|---|---|---|---|
| HDPE | 40 | −10 | |
| PP | 40 | −10 | |
| PET | 40 | −8 | |
| PC | | | 84 |

We claim:

1. A formed polymer article having improved surface characteristics, said polymer article having 1-100 nm thick coating layer of polyhydroxyethylacrylate on at least one surface thereof wherein said coating layer is formed by plasma vapor polymerization of hydroxyethylacrylate and said polymer article has a residence time in said vapor of from 0.1-20 seconds.

2. The article of claim 1, wherein said coating layer has a thickness of 5-60 nm.

3. The article of claim 1, wherein said polymer is selected from the group consisting of polyolefins, polystyrenes, polystyrene copolymers, polymethacrylates, polycarbonates, polyesters, polyamides and mixtures thereof.

4. The article of claim 1, wherein said coating layer has a water advancement contact angle of 45°-54° and a water recess contact angle of 11°-12°.

5. A process for preparing a formed polymer article having improved surface characteristics, comprising plasma vapor polymerizing hydroxyethylacrylate on the surface of a polymer article to form a 1-100 nm thick coating layer of polyhydroxyethylacrylate on a surface of said article, wherein said polymer article has a residence in said vapor of from 0.1-20 seconds.

6. The process of claim 5, wherein said plasma polymerization is conducted by contacting said polymer article with hydroxyethylacrylate vapor at a pressure of from 0.1-500 Pa, in the presence of a plasma discharge lasting 0.01-10 seconds.

7. The process of claim 6, wherein said pressure is 0.1-10 Pa, said plasma discharge lasts 0.1-5 seconds, and said residence time is 1-10 seconds.

8. The process of claim 6, wherein said plasma discharge is generated by direct current, alternating current, radio frequency radiation or microwave radiation.

9. A method of improving the wettability of a polymer article, comprising:
polymerizing hydroxyethylacrylate onto the surface of a polymer article to form a 1-100 nm thick layer of polyhydroxyethylacrylate on a surface of said polymer article.

10. The process of claim 9, wherein said coating layer has a water advancement contact angle of 45°-54° and a water recess contact angle of 11°-12°.

* * * * *